United States Patent
Yang et al.

(10) Patent No.: US 9,789,907 B2
(45) Date of Patent: Oct. 17, 2017

(54) METHOD AND APPARATUS FOR REINFORCING A VEHICLE FLOOR PAN TO PREVENT SEPARATION IN A SIDE IMPACT

(71) Applicant: Ford Global Technologies, LLC, Dearborn, MI (US)

(72) Inventors: Herbert Yang, Saline, MI (US); Zhenyan Gao, Northville, MI (US); Pratt Kamath, Plymouth, MI (US); John Michael McGuckin, Ann Arbor, MI (US); Senthilkum Mahadevan, Sterling Heights, MI (US); Sean Timothy Ryan, Farmington Hills, MI (US); Michael Luchtman, Clawson, MI (US); Bhimaraddi Venkaraddi Alavandi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/809,503

(22) Filed: Jul. 27, 2015

(65) Prior Publication Data

US 2017/0029031 A1    Feb. 2, 2017

(51) Int. Cl.
*B62D 21/15*     (2006.01)
*B23K 11/087*    (2006.01)
*B62D 25/20*     (2006.01)
*B62D 29/00*     (2006.01)
(Continued)

(52) U.S. Cl.
CPC .......... *B62D 21/155* (2013.01); *B23K 11/087* (2013.01); *B62D 21/157* (2013.01); *B62D 25/20* (2013.01); *B62D 25/2027* (2013.01); *B62D 25/2036* (2013.01); *B62D 27/023* (2013.01); *B62D 29/007* (2013.01); *B62D 65/02* (2013.01)

(58) Field of Classification Search
CPC ...... B62D 21/155; B62D 25/20; B62D 65/02; B62D 27/023; B62D 25/2036; B62D 21/157; B62D 25/2027; B62D 29/007; B23K 11/087
USPC ................................................... 296/187.08
See application file for complete search history.

(56) References Cited

U.S. PATENT DOCUMENTS

| | | | |
|---|---|---|---|
| 3,054,636 A | 9/1962 | Wessells, III | |
| 4,673,205 A * | 6/1987 | Drewek | B62D 25/087 293/132 |
| 7,404,594 B2 | 7/2008 | Coakley | |

(Continued)

FOREIGN PATENT DOCUMENTS

WO    2014103638 A1    7/2014

*Primary Examiner* — Joseph D Pape
*Assistant Examiner* — Dana Ivey
(74) *Attorney, Agent, or Firm* — Jason Rogers; Brooks Kushman P.C.

(57) ABSTRACT

A side impact protective structure is provided for a vehicle floor pan. Right and left rear rails are attached, respectively, to right and left lateral sides of the floor pan. A kick-up cross member extends transversely between the right and left rocker assemblies. A right reinforcement is welded to the floor pan, the right rear rail, and the kick-up cross member. A left reinforcement is welded to the left rear rail, to the floor pan and the kick-up cross member. An assembly method includes the steps of selecting a thin mild steel floor pan between a thicker HSLA steel structural member and a thicker corner reinforcement and welding the components together with three thickness welds.

12 Claims, 3 Drawing Sheets

(51) Int. Cl.
  *B62D 27/02*  (2006.01)
  *B62D 65/02*  (2006.01)

(56) References Cited

U.S. PATENT DOCUMENTS

| | | |
|---|---|---|
| 8,585,134 B2 | 11/2013 | Yasui et al. |
| 8,727,380 B2 | 5/2014 | Akaki et al. |
| 8,807,597 B2 | 8/2014 | Akaki et al. |
| 8,820,819 B2 | 9/2014 | Tamaki |
| 2010/0289295 A1 | 11/2010 | Yoda et al. |
| 2012/0319433 A1 | 12/2012 | Bufe et al. |
| 2013/0257097 A1 | 10/2013 | Kojo et al. |

\* cited by examiner

METHOD AND APPARATUS FOR REINFORCING A VEHICLE FLOOR PAN TO PREVENT SEPARATION IN A SIDE IMPACT

TECHNICAL FIELD

This disclosure relates to the structure of a vehicle that includes a doubler reinforcement that is constructed to resist separation of the floor pan from a rear rail that is welded to a rocker assembly and a kick-up cross member.

BACKGROUND

The floor pan of a vehicle provides a floor in the passenger compartment. The floor pan extends between the rocker panel assemblies and the rear rails. The floor pan is also supported by cross-members below the floor pan. Vehicles are tested for side impact protection in a test identified as FMVSS No. 214 "Side Impact Rigid Pole Test" The test requires impacting a rigid pole 254 mm in diameter with the side of a vehicle at a speed of 32.2 km/h. One potential problem is indicated if the floor pan separates from vehicle structures such as an adjacent rocker assembly, a rear rail or a kick-up cross member.

Floor pan separation may be attributed to spot weld failure. Spot welds in automotive vehicles are subjected to complex loading during a collision event. Shear loading of spot welds occurs as a result of relative displacement or in-plane rotation of adjacent sheets. Tensile loading occurs as a result of separation forces applied between adjacent sheets in a direction normal to the adjacent sheets.

Lower gauge sheet metal is increasingly being used in vehicles to reduce weight and increase fuel economy. With the use of lower gauge sheet metal, spot weld strength may be inadequate to prevent floor pan separation in a side impact collision depending upon the specific design of the vehicle structure.

This disclosure is directed to the above problems and other problems as summarized below.

SUMMARY

According to one aspect of this disclosure, a vehicle body structure is provided that reduces floor panel separation from adjacent supporting structures. The body structure includes a floor pan, a rocker assembly, a rear rail, a kick-up cross member, and a corner reinforcement (or doubler). The floor pan is attached to rocker assembly through the rear rail on a lateral side of the floor pan. The kick-up cross member is attached to a transversely extending side of the floor pan. The corner reinforcement is welded to the floor pan, the rear rail, and the kick-up cross member.

According to another aspect of this disclosure, a side impact protective structure is provided for a vehicle including a floor pan. The floor pan is welded to a right rear rail and a left rear rail that are, in turn, connected to the right and left rocker assemblies, respectively. A kick-up cross member extends transversely between the right and left rocker assemblies. A right reinforcement is welded to the floor pan, the right rear rail, and the kick-up cross member. A left reinforcement is welded to the left rear rail, the floor pan and the kick-up cross member.

According to other aspects that are potentially applicable to the above structures, the corner reinforcement may include a body portion disposed in a horizontal plane that is welded to a floor portion of the floor pan and to a rear rail attachment flange of the floor pan.

The floor pan may be made of a mild steel sheet metal (steel having between 0.05 and 0.10 carbon) and the kick-up cross member may be made of a high strength low-alloy (HSLA) steel sheet metal (eg. ASTM A242; A441; or A588) and the corner reinforcement may be made of a HSLA steel sheet metal. The floor pan may be made of sheet metal having a first thickness, the kick-up cross member may be made of sheet metal having a second thickness that is greater than the first thickness, and the corner reinforcement may be made of sheet metal having a third thickness that is greater than the first thickness.

The body structure may include a three thickness resistance weld through the kick-up cross member, the floor pan and the reinforcement. The resistance weld forms a weld nugget that is stronger than a weld nugget formed by welding the floor pan to the kick-up cross member.

Three thickness welds are provided between the corner reinforcement, the floor pan and the rear rail. Additional three thickness welds are provided between the corner reinforcement, the floor pan, and the kick-up cross member.

According to another aspect of this disclosure, an assembly method is provided for minimizing the potential for floor pan separation as a result of a side impact collision. The method comprises providing a first part having a first thickness and providing a second part having a second thickness that is greater than the first part. A reinforcement, or doubler, is provided that sandwiches the first part between the second part and the reinforcement. The first part, the second part and the reinforcement are welded together with a plurality of welds through three layers of metal.

According to other aspects of the assembly method, the reinforcement may have a third thickness that is greater than the first thickness. The joint stiffness and fatigue life of the welds between the first and second parts are improved by welding the reinforcement to the first and second parts. The first part may be made of a mild steel sheet metal and the second part may be made of a high strength low-alloy (HSLA) steel sheet metal. The reinforcement may be made of a HSLA steel sheet metal.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
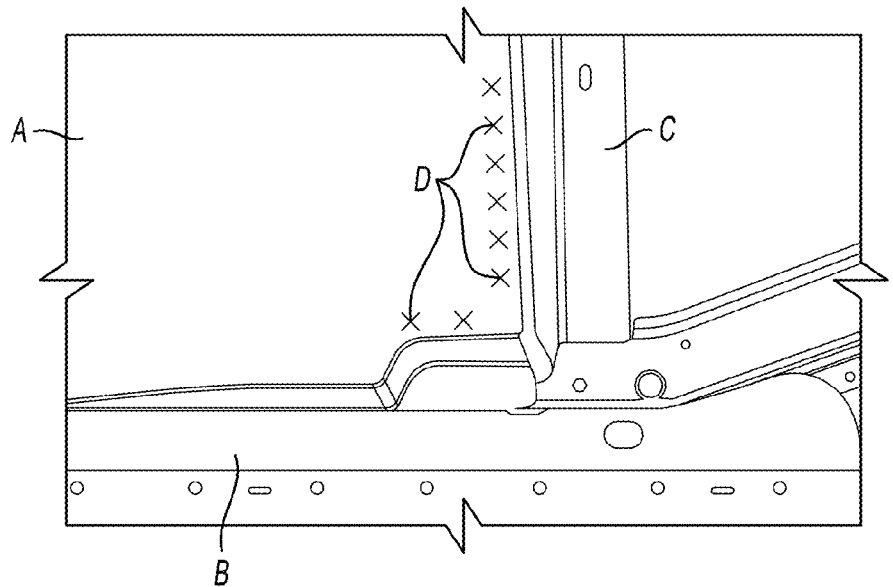
FIG. 1 is a fragmentary bottom plan view of a floor pan, a rocker and a kick-up cross member beam of conventional design with two thickness welds connecting the floor pan to the rear rail and to the kick-up cross member beam.

Referring to FIG. 1, a conventional design of a vehicle floor pan A support structure is illustrated at one corner of the floor pan. The floor pan A is attached on its outboard side to a rocker assembly B. The floor pan A is also supported on its rear edge by a kick-up cross member beam C. The floor pan A is welded with two thickness welds ("2-T welds") to both the rocker B and the kick-up cross member beam C. In tests of this design, the floor pan A separated from both the rocker B and the kick-up cross member beam C.

Figure 2:
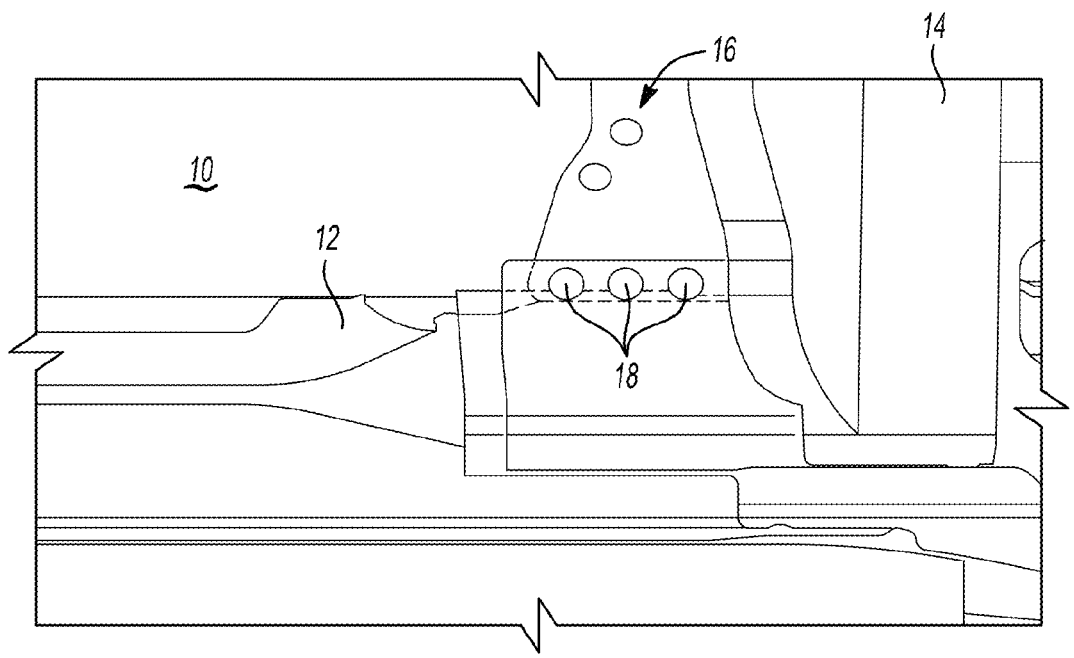
FIG. 2 is a fragmentary top plan view of a floor pan, a rocker assembly, a rear rail, a kick-up cross member, and a corner reinforcement made according to this disclosure with a first set of three thickness welds connecting the floor pan, the rear rail, and the corner reinforcement and with a second set of three thickness welds connecting the floor pan, the kick-up cross member, and the corner reinforcement.

Referring to FIG. 2, an improved floor pan 10 is partially illustrated in a corner area where the floor pan 10 is resistance welded to a rear rail (shown in FIG. 3) that is, in turn, welded to a rocker assembly 12 and a kick-up cross member 14. A corner reinforcement 16 is connected by three thickness welds 18 ("3-T welds") to the rear rail (shown in FIG. 3) that is, in turn, welded to the rocker 12 and also to the kick-up cross member 14. The corner reinforcement 16 may also be referred to as a "doubler." The corner reinforcement 16 is welded by resistance welding to both the floor pan 10 and indirectly to the rocker assembly 12. The corner reinforcement 16 is also welded with 3-T welds 18 to the kick-up cross member 14 as shown in FIG. 3.

Figure 3:
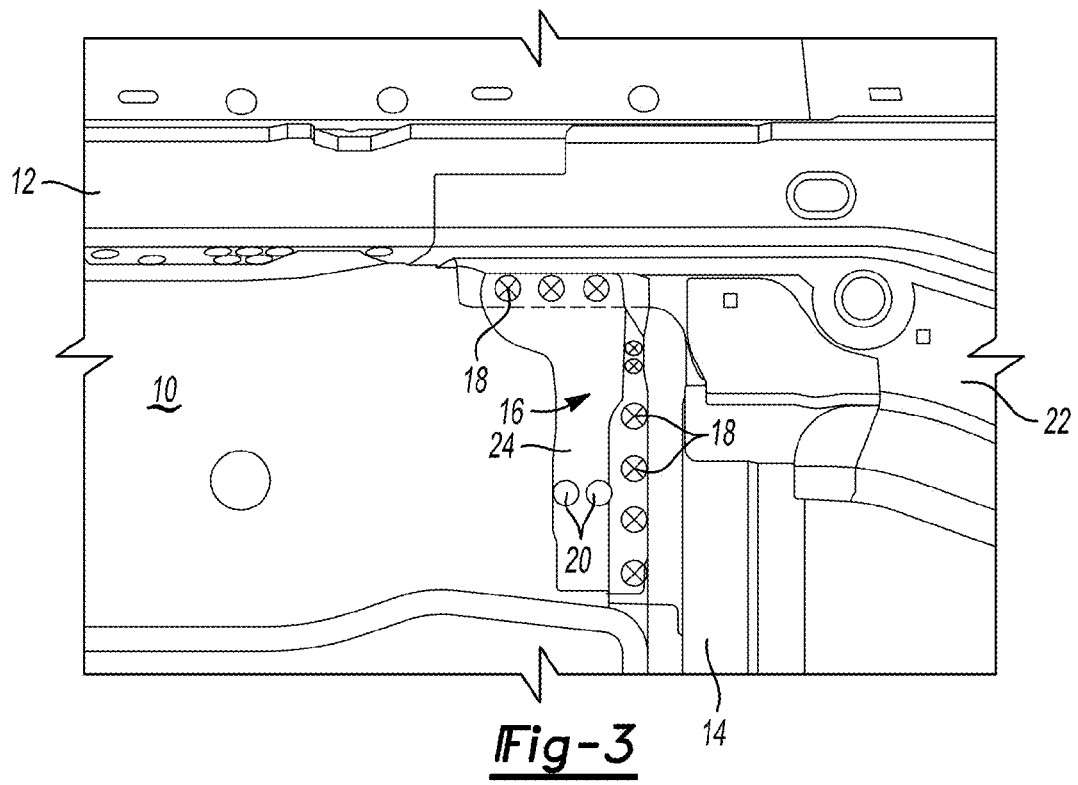
FIG. 3 is a bottom plan view of the floor pan, the rear rail, the rocker assembly, the kick-up cross member, and the corner reinforcement.

Referring to FIG. 3, the floor pan 10 is shown in a bottom plan view to including portions of the rocker 12, the rear rail 22, the kick-up cross member 14, and the corner reinforcement 16. The 3-T welds 18 are indicated by X's in FIG. 3 to differentiate them from 2-T welds 20 on the floor pan 10. The rocker 12, rear rail 22, kick-up cross member 14 and corner reinforcement 16 are all formed of high HSLA steel and may have a thickness of 1.5 mm. The corner reinforcement 16 is formed of HSLA and may have a thickness of 1.0 mm. The floor pan 10 may have a thickness of 0.65 mm to reduce weight and is formed of mild steel.

A first set of 3-T welds 18 through the corner reinforcement 16 resist floor pan separation by providing additional metal in the area of the 3-T welds 18. The additional metal is provided to assure more consistent and robust weld nuggets between the floor pan 10, rocker 12 and corner reinforcement 16. A second set of 3-T welds 18 are formed between the floor pan 10, the kick-up cross member 14 and the corner reinforcement 16.

The first set of 3-T welds 18 lie in a horizontal plane and are aligned in the longitudinal vehicle direction. The second set of 3-T welds 18 lie in a horizontal plane and are aligned in a transverse vehicle direction. The corner reinforcement 16 includes a body portion 24 disposed in a horizontal plane that is welded by the first set of 3-T welds 18 to the floor pan 10 and the kick-up cross member 14. The corner reinforcement 16 is welded by the second set of 3-T welds 18 to the rear rail 22, and the floor pan. The rear rail is welded to the rocker assembly 12.

The corner reinforcement 16 increases resistance to floor pan separation. The floor pan 10 with the corner reinforcement 16 may be maintained at the thin 0.65 mm thickness and may also be made of mild steel. The corner reinforcement 16 provides improved performance of the vehicle in an oblique pole side impact test with the addition of the corner reinforcement 16 that adds only a small amount of weight while enabling the weight of the floor pan 10 to be minimized.

Figure 4:
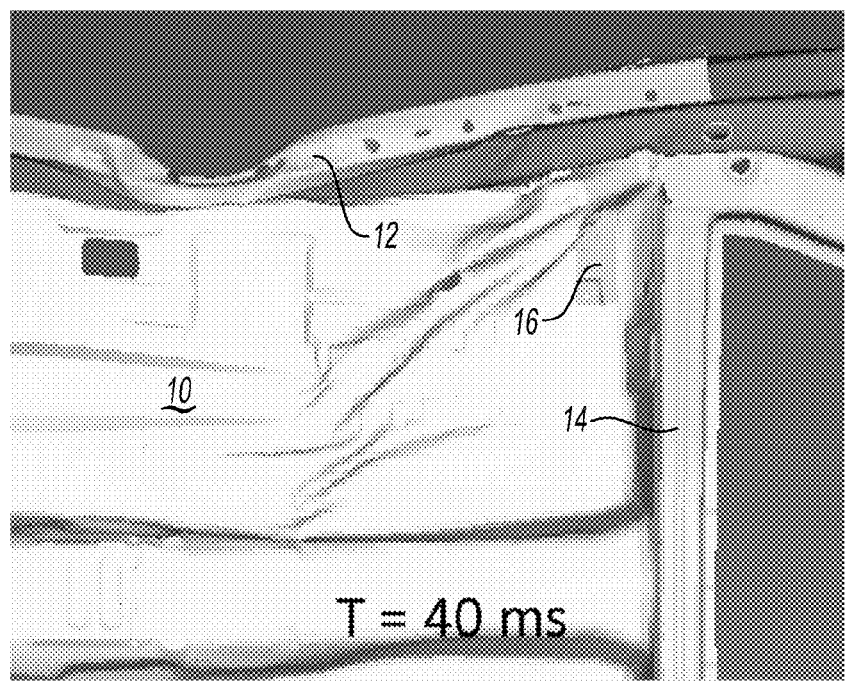
FIGS. 4-6 are a sequence of views of a computer simulation of a 20 mph oblique pole side impact with a vehicle made according to this disclosure at 40 ms, 60 ms and 80 ms.
Figure 5:
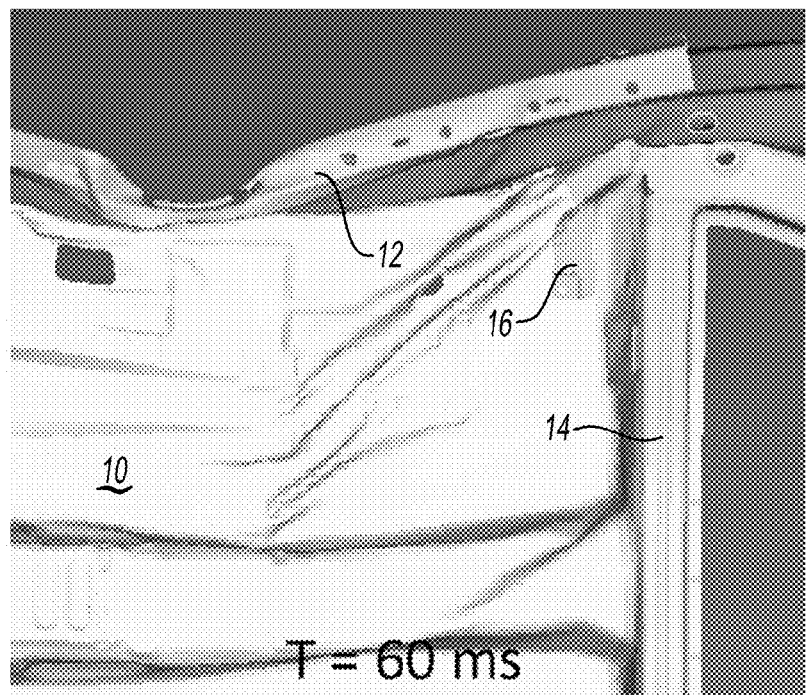
Figure 6:
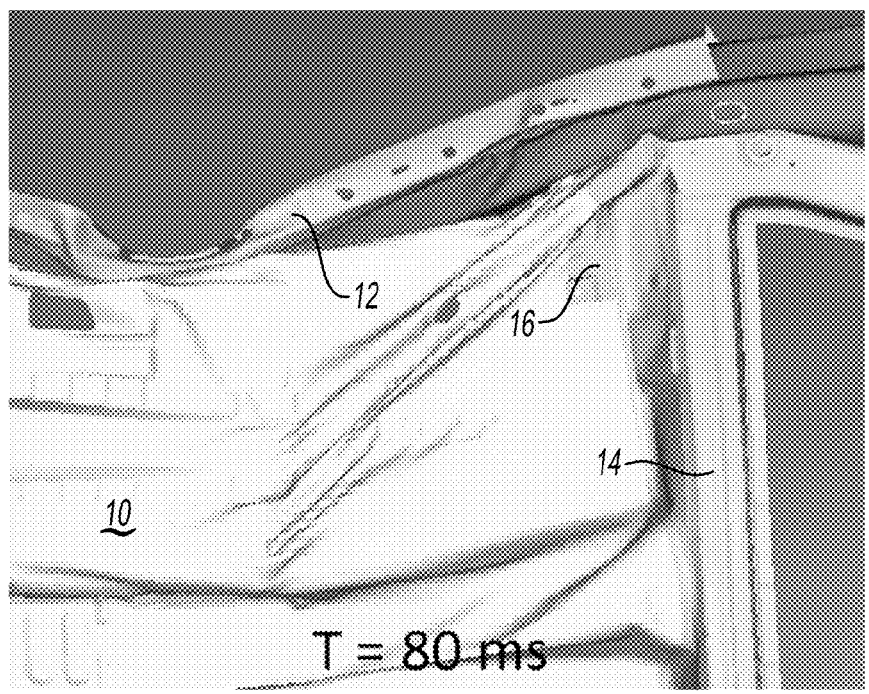

Referring to FIGS. 4-6, a series of views of a computer simulated oblique pole side impact test with a vehicle are illustrated. Referring to FIG. 4, the floor pan 10 is shown after impact with an oblique pole that contacts the rocker 12 and compresses the floor pan 10. The floor pan 10 is also shown connected to the kick-up cross member 14 and the corner reinforcement 16.

Referring to FIG. 5, an impact with an oblique pole side impact as illustrated at 60 ms. At this point, the rocker panel 12 is further deformed into the floor pan 10 and additional stress is applied to the kick-up cross member 14 and the corner reinforcement 16.

Referring to FIG. 6, the test vehicle is shown at 80 ms after an impact with an oblique pole side impact test. At this point, the rocker 12 is compressed into the floor pan 10. The kick-up cross member 14 and corner reinforcement 16 are shown to have suffered no separation of the floor pan 10 from the rear rail 22 (that is attached to the rocker 12) or the kick-up cross member 14. In comparable oblique pole side impact tests of actual vehicles, substantial floor pan separation was observed. The floor pan 10 in the actual vehicle tests without the corner reinforcement, such as the design shown in FIG. 1, resulted in separation from the rear rail and its attached rocker and also from the kick-up cross member beam.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle body structure comprising:
    a floor pan including a corner;
    a rear rail attached to a lateral side of the corner;
    a cross member attached to a transversely extending side of the corner; and
    a reinforcement welded to the corner by a first set of three thickness welds to the floor pan and the rear rail and by a second set of three thickness welds to the floor pan and the cross member.

2. The body structure of claim 1 wherein the rear rail is welded to a rocker assembly.

3. The body structure of claim 1 wherein the floor pan is made of a mild steel sheet metal and the cross member is made of a high strength low-alloy (HSLA) steel sheet metal and the reinforcement is made of a HSLA steel sheet metal.

4. The body structure of claim 1 wherein the floor pan is made of sheet metal having a first thickness, the cross member is made of sheet metal having a second thickness that is greater than the first thickness, and the reinforcement is made of sheet metal having a third thickness that is greater than the first thickness.

5. The body structure of claim 1 wherein a resistance weld through the cross member, the floor pan and the reinforcement forms a weld nugget that is stronger than a weld nugget formed by welding the floor pan to the cross member.

6. The body structure of claim 1 wherein the corner reinforcement is welded to the floor pan and the rear rail and the reinforcement is welded to the floor pan and the cross member with a plurality of three thickness welds.

7. A side impact protective structure for a vehicle comprising:
    a floor pan including two rear corners;
    right and left longitudinally extending rear rails;

a cross member extending transversely between the rear rails;

a right corner reinforcement welded through one rear corner, and the right rear rail and the cross member; and a left corner reinforcement welded through another rear corner, the left rear rail, and the cross member.

8. The side impact protective structure of claim 7 wherein the right and left rear rails are welded to right and left rocker assemblies, respectively.

9. The side impact protective structure of claim 7 wherein the floor pan is made of mild steel sheet metal and the cross member is made of high strength low-alloy (HSLA) steel sheet metal and the right and left corner reinforcements are made of a HSLA steel sheet metal.

10. The side impact protective structure of claim 7 wherein the floor pan is made of sheet metal having a first thickness, the cross member is made of sheet metal having a second thickness that is greater than the first thickness, and the right and left corner reinforcements are made of sheet metal having a third thickness that is greater than the first thickness.

11. The side impact protective structure of claim 7 wherein a resistance weld through the cross member, the floor pan and each of the right and left corner reinforcements form a three thickness weld nugget that is stronger than a two thickness weld nugget formed by welding the floor pan to the kick-up cross member.

12. The side impact protective structure of claim 7 wherein the right and left reinforcements are welded with three thickness welds to the floor pan and the right and left rear rails, respectively, and wherein the right and left reinforcements are welded with three thickness welds to the floor pan and the cross member.

\* \* \* \* \*